R. G. LECKIE.
Improvement in Apparatus for Evaporating and Concentrating Brine and other Liquids.
No. 114,831. Patented May 16, 1871.
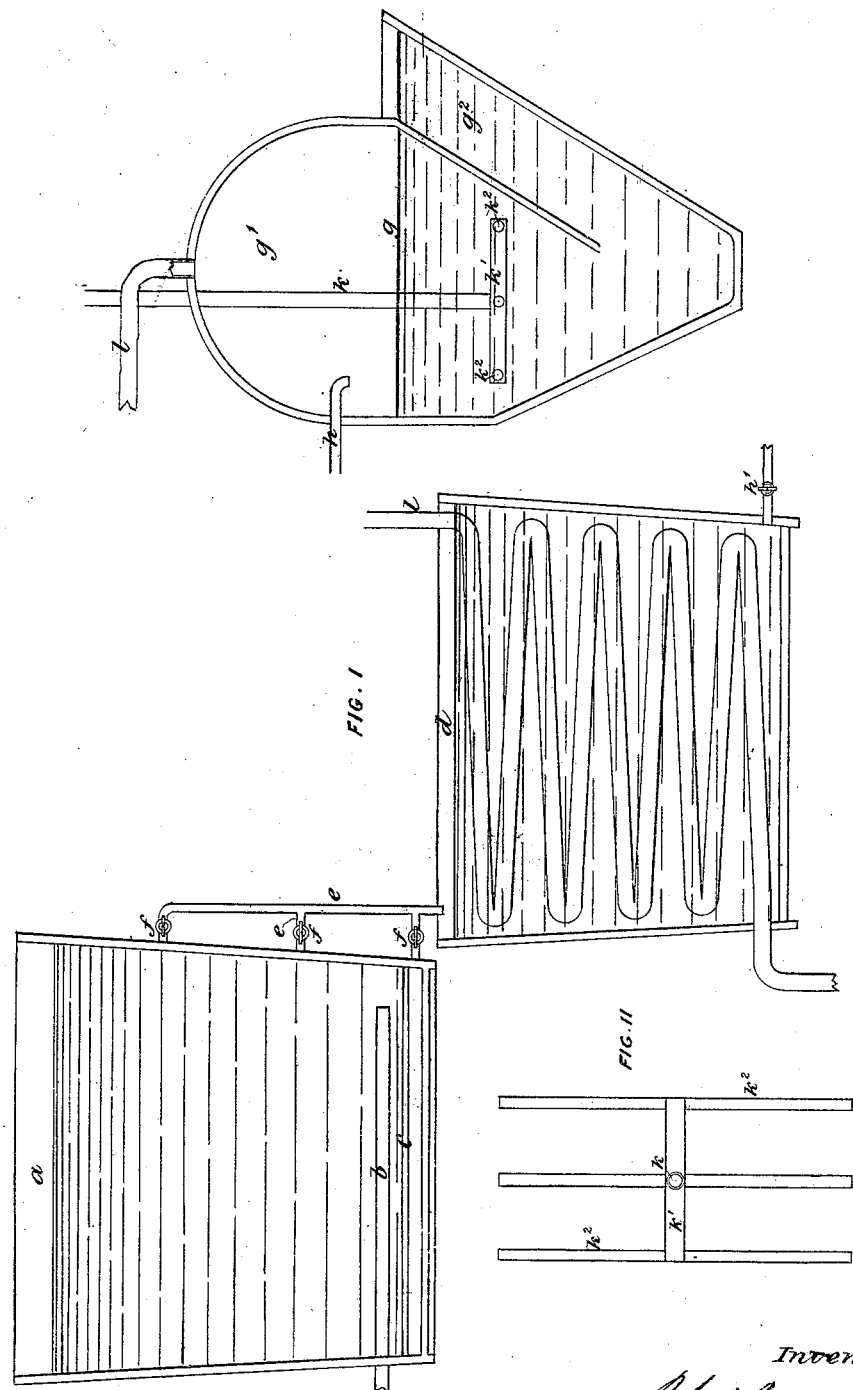

R. G. LECKIE.
Improvement in Apparatus for Evaporating and Concentrating Brine and other Liquids.
No. 114,831. Patented May 16, 1871.
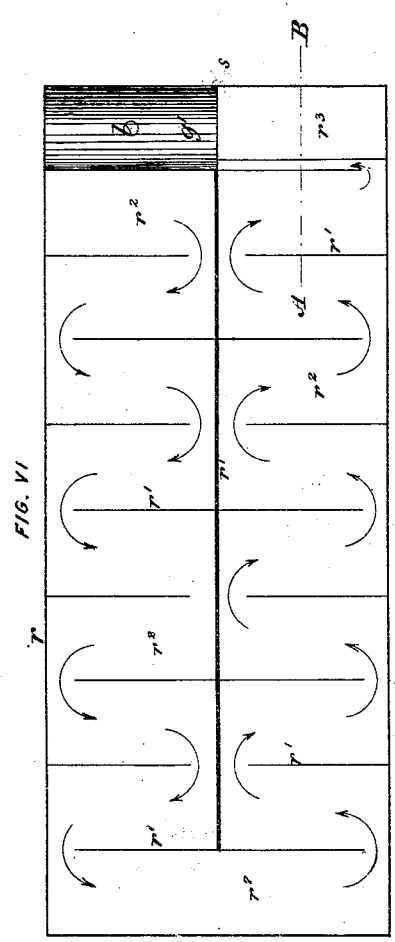
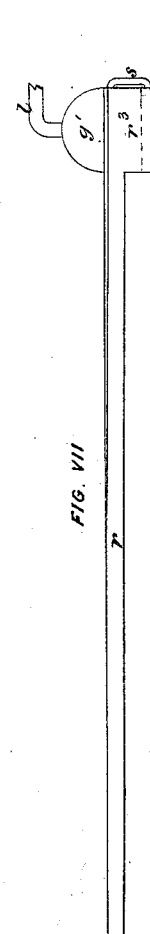
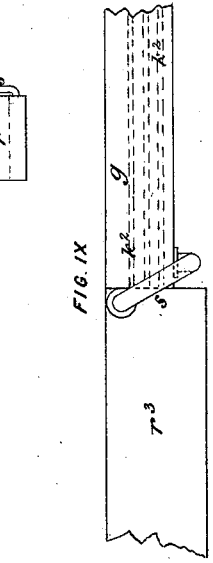
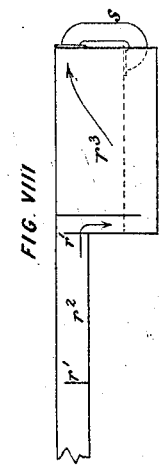
Witnesses
Charles Legge
R. Thompson
Inventor
R. Hall Gilmour Leckie R. G. LECKIE.
Improvement in Apparatus for Evaporating and Concentrating Brine and other Liquids.
No. 114,831.
3 Sheets--Sheet 3.
Patented May 16, 1871.
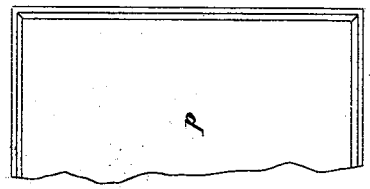
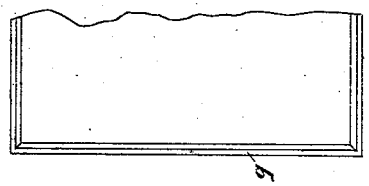
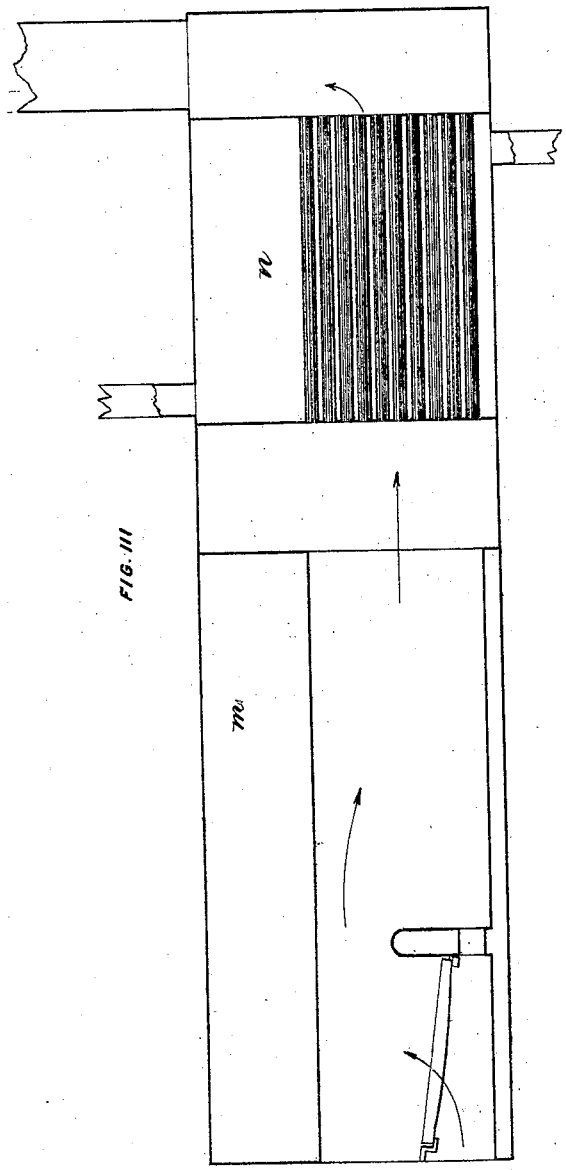
Witnesses
Charles Legge
R Thompson
Inventor
R Watfilmore Leckie

United States Patent Office.

ROBERT GILMOUR LECKIE, OF ACTON VALE, CANADA.

Letters Patent No. 114,831, dated May 16, 1871.

IMPROVEMENT IN APPARATUS FOR EVAPORATING AND CONCENTRATING BRINE AND OTHER LIQUIDS.

The Schedule referred to in these Letters Patent and making part of the same.

*To all whom it may concern:*

Be it known that I, ROBERT GILMOUR LECKIE, of the village of Acton Vale, county of Bagot and Province of Quebec, Canada, gentleman, have invented certain new and useful "Improvements on the Process and Apparatus for Evaporating and Concentrating Brine and other Liquids;" and I do hereby declare that the following is a full, clear, and exact description of the construction and operation of the same, reference being had to the annexed drawing, where—

Figure I represents a sectional view of the apparatus.

Figure II represents a plan of heating pipes in evaporators.

Figure III represents a section of boiler and air-heater.

Figure IV represents a plan of crystallizing-pan.

Figure V represents a section of crystallizing-pan.

Figure VI represents a plan of combined crystallizing-vessel and evaporator.

Figure VII represents a side elevation of the same.

Figure VIII represents a sectional elevation, showing pipe on line A B.

Figure IX represents an end view, showing pipe on line A B.

This invention relates to a process for evaporating brine, and consists, mainly, in the combination and arrangement of the devices for carrying that process into effect.

By this invention salt can be manufactured from brine in a shorter time, of better quality, at less expense, and with less wear and tear to the apparatus, than by the methods now ordinarily employed, and by this process salt may be produced with coarse or fine crystals, as may be desired.

In the drawing similar letters of reference indicate like parts.

Letter $a$ is a vat of any convenient form, preferably of wood, into which the brine is first received for treatment. In some brines an appreciable amount of carbonate of iron and of sulphate of lime or gypsum is held in solution, and to precipitate these is the first operation to be performed.

Near the bottom of the vat $a$ a pipe, $b$, perforated at top, or of any convenient arrangement, is introduced, through which the heated air is injected into the brine with sufficient force to overcome the pressure of the superincumbent water. By the action of the oxygen the carbonate of iron is decomposed and precipitated as a peroxide of iron, a false bottom, $c$, formed of a grating covered with strong canvas or its equivalent, being placed in the vat $a$ for the purpose of receiving this precipitate and allowing the brine to pass through.

The contents of the vat $a$ being raised to a high temperature by the action of the heated air, partial evaporation takes place, and by the combined action of the heat and concentration of the brine the sulphate of lime is precipitated in the form of crystals. The false bottom is made movable, so as to be taken out and cleaned when requisite.

The brine, having been partially treated in this manner, is drawn off into a reservoir, $d$, by pipes $e$, provided with cocks $f$. This reservoir $d$, constructed of wood or any other suitable material, is used principally to insure a regular supply of brine to the evaporating-vessel $g$, so as not to cause any interruption to the work when the vat $a$ is being cleaned. It may, however, be omitted if two vats, $a$, are used.

The brine is conducted by a pipe, $h$, as shown, furnished with cock $h'$, to the evaporating-vessel $g$, constructed of the form shown, of wood or any convenient material, the upper part or dome $g^1$, if desired, being made of metal, one side of this vessel, as at $g^2$, being left open to allow of the removal of the crystals of salt as they form and fall down.

The heated air is introduced into the evaporator by a pipe, $k$, terminating in a horizontal pipe, $k^1$, from which are carried any suitable number of smaller perforated pipes, $k^2$, as shown, so that the air may be distributed through the brine in the upper portion of evaporating-vessel $g$. The "mother liquor" remaining after the formation of the salt crystals may be drawn off by means of a siphon placed in the open space $g^2$, or by any other convenient method, the crystals having been removed from time to time, without interrupting the progress of the work, by any convenient means, such as a rake or scoop inserted through the opening $g^2$.

The steam arising from the process of evaporation may, for the purpose of utilizing the heat contained in it, be conveyed by the pipe $l$, continued as a worm, through the reservoir $d$, for the purpose of partially warming the brine contained therein.

The air-heater is composed of a steam-boiler, $m$, of any suitable size or configuration commensurate with the scale of operations to be performed, and from which the products of combustion are carried into any suitable heater, $n$, for the purpose of supplying heated air to the different vessels, as hereinbefore described. In the evaporating-vessel $g$ superheated steam, generated in any ordinary manner, may be used instead of heated air.

The above process refers more particularly to the manufacture of salt in fine crystals; but should crystals of a large size be required, the precipitation will take place at a lower temperature, and the operation be performed as follows:

The brine, having been brought as above in the evaporating-vessel $g$ to the point of supersaturation, is drawn off in any convenient method, and conveyed, for the purpose of crystallization, to any open pan or vessel having a smooth bottom.

Crystallization having, in this open pan and at a lower temperature, taken place to a certain degree, the supernatant liquid is reconveyed to the evaporating-vessel $g$ for further treatment and concentration, until again brought to the point of supersaturation, when it is again conveyed to the crystallizing-vessel, and so on till the supernatant liquid is reduced to what is called mother liquor, in which the chlorides of calcium and magnesia are no longer held in solution, and it is then drawn off and fresh brine introduced.

The heat from the evaporating-vessel may also be utilized by conveying the pipe $l$ to the space $o$ between the pan $p$ and casing $q$ of a crystallizing-vessel, to which place also the exhaust-steam from the engine is conducted for the same purpose. In this pan the brine is subjected to the usual treatment.

Figs. VI, VII, VIII, and IX show the action of the evaporating-vessel $g$, in combination with a large shallow crystallizing-vessel, $r$, divided by longitudinal and transverse partitions $r^1$ into any suitable number of chambers $r^2$ $r^3$ is the receiving-chamber, into which the brine is first introduced, and from which it is conveyed by a pipe, $s$, as shown in Figs. VII and VIII, to the evaporating-vessel $g$, in which it is treated, as previously described, by the introduction of heated air through the perforated pipes $k^2$, the pipe $l$ in the dome $g^1$ serving, as before, to convey the steam arising from the process of evaporation to any desired point.

The temperature of the brine in the evaporating-vessel $g$, being higher than in the receiving-chamber, secures the steady and continuous flow of the brine from the latter to the former, and the brine, having been partially evaporated or brought in the vessel $g$ to the point of supersaturation, escapes through any suitable aperature in the side of the evaporating-vessel into the chamber $r^2$, flows slowly in the direction marked by the arrows, Fig. VI, the transverse partitions $r^1$ causing it to flow in a more circuitous manner, so retarding its progress, and enabling it to deposit crystals until it again reaches the receiving-chamber $r^3$, whence it is again conveyed to the evaporator and reoperated upon, as described in the previous modifications, until the brine is reduced to the condition of mother liquor, when it is, as before, removed, and fresh brine introduced.

The crystals formed by the foregoing processes may now be conveyed in any ordinary manner to the drying-room, through which the waste products of combustion from the steam-boiler and air-heater may be carried, for the purpose of economizing fuel; or they may be discharged through a chimney, as shown in the drawing.

Having now described the construction and operation of my invention,

What I claim as my invention, and wish secured by Letters Patent, is as follows:

1. The combination of the vat $a$, pipe $b$, and other component parts, with or without reservoir $d$, with the evaporating-vessel $g$, pipes $k$ $k^1$ $k^2$, boiler $m$, and air-heating vessel $n$, as and for the purpose described.

2. The arrangement of vat $a$ and pipe $b$ for precipitating the carbonate of iron and other impurities, as described.

3. The combination of the vat $a$, evaporating-vessel $g$, pan $p$, with or without space $o$ and casing $q$, boiler $m$, and air-heating vessel $n$, as described.

4. The arrangement of the pipe $e$ and vessel $d$ for utilizing the heat of the steam from the evaporating-vessel $g$, as described.

5. The evaporating-vessel $g$ and crystallizing-vessel $r$, combined and arranged as described.

Montreal, 10th day of March, A. D. 1871.

ROBERT GILMOUR LECKIE.

Witnesses:
CHARLES LEGGE,
CHARLES G. O. SIMPSON.